US009655030B2

(12) United States Patent
Rodrigo

(10) Patent No.: US 9,655,030 B2
(45) Date of Patent: May 16, 2017

(54) METHOD OF CONNECTION WITH A COMMUNICATIONS NETWORK WHEN ACCESS POINT SUPPORTS INTER-WORKING

(75) Inventor: Inmaculada Carrion Rodrigo, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 471 days.

(21) Appl. No.: 10/868,895

(22) Filed: Jun. 17, 2004

(65) Prior Publication Data

US 2005/0153684 A1    Jul. 14, 2005

(30) Foreign Application Priority Data

Jan. 13, 2004 (GB) .................................. 0400694.6

(51) Int. Cl.
| | | |
|---|---|---|
| H04W 48/16 | (2009.01) | |
| H04M 7/00 | (2006.01) | |
| H04M 3/42 | (2006.01) | |
| H04W 48/18 | (2009.01) | |
| H04W 48/20 | (2009.01) | |
| H04W 84/12 | (2009.01) | |
| H04W 88/10 | (2009.01) | |

(52) U.S. Cl.
CPC ............. *H04W 48/16* (2013.01); *H04M 7/00* (2013.01); *H04M 3/42289* (2013.01); *H04M 2207/18* (2013.01); *H04W 48/18* (2013.01); *H04W 48/20* (2013.01); *H04W 84/12* (2013.01); *H04W 88/10* (2013.01)

(58) Field of Classification Search
CPC ..... H04W 12/06; H04W 84/12; H04W 88/10; H04W 12/04; H04W 24/00; H04W 48/16; H04W 84/042; H04L 63/08; H04L 63/162; H04L 63/205; H04L 63/0428

USPC ....... 455/435.1, 552.1, 411, 426.1, 423, 410, 455/432.1, 445
See application file for complete search history.

(56) References Cited

U.S. PATENT DOCUMENTS 6,208,870 B1 * 3/2001 Lorello et al. ................ 455/466
6,330,686 B1 * 12/2001 Denny et al. ..................... 714/4
(Continued)

FOREIGN PATENT DOCUMENTS

| JP | 2007-502037 | 2/2007 |
| WO | WO 03/088578 | 10/2003 |
| WO | WO 03/105493 A2 | 12/2003 |
| WO | WO 2004/002051 A2 | 12/2003 |
| WO | WO 2004/002073 A2 | 12/2003 |

OTHER PUBLICATIONS

3GPP TS 24.234 V1.0.0 (Dec. 2003); 3rd Generation Partnership Project; Technical Specification Group Core Network; 3GPP System to WLAN Interworkin; UE to Network protocols; Stage 3 (Release 6).*

(Continued)

*Primary Examiner* — Matthew Sams
(74) *Attorney, Agent, or Firm* — Mintz Levin Cohn Ferris Glovsky and Popeo, P.C.

(57) ABSTRACT

A method of connecting user equipment to a communications network via a wireless local area network, said method comprising the steps of a first selecting step for selecting an access point; a second selecting step for selecting a communications network; wherein if said connection fails, sending a message comprising information indicating if said access point supports inter-working with a communications network.

29 Claims, 3 Drawing Sheets

(56) References Cited

U.S. PATENT DOCUMENTS

| | | | | |
|---|---|---|---|---|
| 6,996,714 | B1* | 2/2006 | Halasz | H04L 63/061 |
| | | | | 713/163 |
| 7,171,198 | B2* | 1/2007 | Paila et al. | 455/432.1 |
| 7,284,062 | B2* | 10/2007 | Krantz et al. | 709/229 |
| 2002/0075844 | A1* | 6/2002 | Hagen | 370/351 |
| 2003/0022666 | A1* | 1/2003 | Sato | 455/423 |
| 2003/0139180 | A1* | 7/2003 | McIntosh | H04L 63/0853 |
| | | | | 455/426.1 |
| 2004/0029580 | A1* | 2/2004 | Haverinen et al. | 455/426.1 |
| 2004/0066756 | A1* | 4/2004 | Ahmavaara et al. | 370/328 |
| 2004/0111520 | A1* | 6/2004 | Krantz | H04L 63/08 |
| | | | | 709/229 |
| 2004/0236702 | A1* | 11/2004 | Fink et al. | 705/73 |
| 2005/0088999 | A1* | 4/2005 | Waylett | H04W 88/10 |
| | | | | 370/338 |
| 2005/0120213 | A1* | 6/2005 | Winget et al. | 713/171 |
| 2005/0125693 | A1* | 6/2005 | Duplessis | H04L 63/0428 |
| | | | | 726/4 |
| 2006/0187892 | A1 | 8/2006 | Zhang | |

OTHER PUBLICATIONS

L. Bluck, PPP Extensible Authentication Protocol (EAP), RFC 2284, Mar. 1998, all.*

Blunk, et al., "RFC 2284 PPP Extensible Authentication Protocol (EAP)", Mar. 1998, downloaded from < http://www.ietf.org/rfc/rfc2284.txt > accessed on Aug. 7, 2009.

Aboba, et al., "RFC 2716 PPP EAP TLS Authentication Protocol", Oct. 1999, downloaded from < http://www.ietf.org/rfc/rfc2716.txt > accessed on Aug. 7, 2009.

English Translation of Office Action dated May 18, 2009, issued by the Japanese Patent Office (JPO), in connection with counterpart application 2006-548419.

$3^{rd}$ Generation partnership Project, Technical Specification Group Services and System Aspect; 3GPP system to Wireless Local Area Network (WLAN) Interworking; System Description (Release 6), 3GPP TS 23.234 V2.3.0, Nov. 2003.

Notification of Final Office Action dated Feb. 22, 2010, issued by the Japanese Patent Office in connection with counterpart Japanese application No. 2006-548419.

* cited by examiner

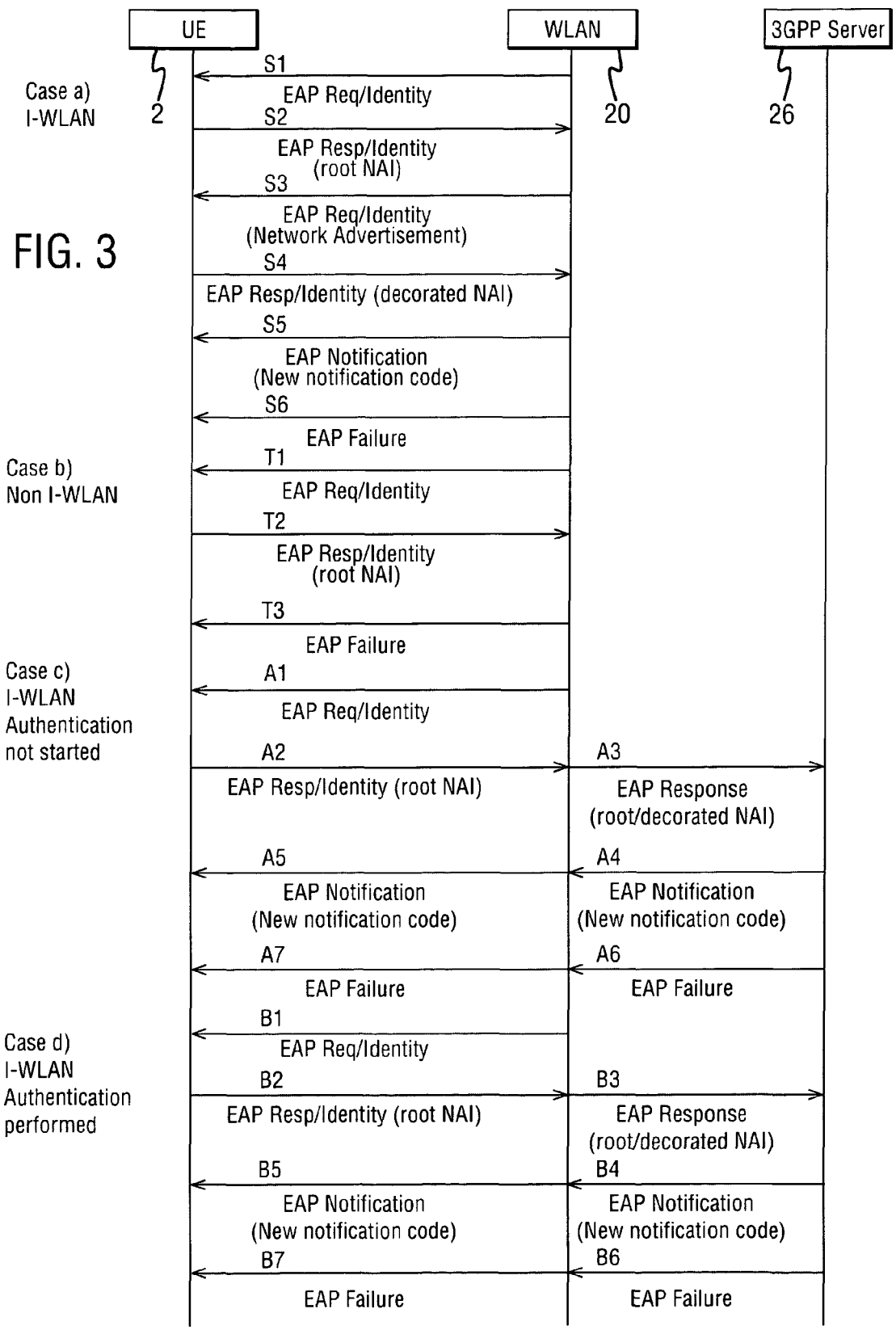

METHOD OF CONNECTION WITH A COMMUNICATIONS NETWORK WHEN ACCESS POINT SUPPORTS INTER-WORKING

FIELD OF THE INVENTION

The present invention relates to a method of connection and in particular but not exclusively to a method of connecting user equipment to a public land mobile network via wireless local area network.

BACKGROUND OF THE INVENTION

The communication system is a facility that enables communication between two more entities such as user terminal equipment and/or network entities and other nodes associated with the communication system. The communication may comprise, for example, a communication of voice, electronic mail (email), text messages, data, multimedia and so on.

A communication may be provided by a fixed line and/or wireless communication interfaces. A feature of wireless communication system is that they provide mobility for the users thereof. An example of communication systems providing wireless communication is a public land mobile network (PLMN). An example of the fixed line system is a public switched telephone network (PSTN).

The communication system typically operates in accordance with a given standard or specification which sets out what the various elements of a system are permitted to do and how that should be achieved. For example, the standard or specification may define if the user or more precisely user equipment is provided with a circuit switched server or a packet switched server or both. Communication protocols and/or parameters, which should be used for the connection, are also typically defined. For example, the manner in which communication is implemented between the user equipment and the elements of the communication network is typically based on a predefined communication protocol. In other words, a specific set of rules on which the communication can be based needs to be defined to enable the user equipment to communicate via the communication system.

The 3G partnership project (3GPP) is defining a reference architecture for the universal mobile telecommunication system (UMTS) core network which will provide the users of user equipment with access to services. The term "service" used in this document should be understood to broadly cover any services or goods which a user may desire, require or be provided with. The term is to be understood to cover the provision of complementary services. In particular, but not exclusively, the term "service" will be understood to include internet protocol multimedia IM services, conferencing, telephoning, gaming, rich call, presence, e-commerce, messaging and instant messaging.

Reference will be made to the 3GPP technical specification TS24.234 and TS23.234, both documents, which are hereby incorporated by reference. Both of these documents relate to WLAN (wireless local area network) inter working. WLAN inter working is inter working between a proposed 3GPP system and the WLAN family of standards. Examples of WLAN radio network type technology include Bluetooth, the IEEE standards 802.11B, 802.11G, 802.11A and HIPERLan-2. The wireless local area network inter working allows a WLAN UE (user equipment) to connect to a WLAN and from there to either a visited PLMN or the home HPLMN. The PLMNs are 3G communication systems. A WLAN UE is all the user equipment, which can be used to allow a 3GPP subscriber to access the WLAN inter working. This may include, for example a computer. It should be appreciated that the WLAN UE may be capable of WLAN access only or may be capable of WLAN and 3GPP system access.

In the proposed specification, the network selection procedure consists of two parts. The first part is radio selection. This is the first phase of network selection and always takes place before VPLMN (visited PLMN) selection. In this phase the WLAN UE selects an access point AP and associates itself with it. The parameter used for the selection of the access point is the SSID (service set ID). In the second part, the VPLMN is selected. After selecting an access point, that is after completion of the radio selection, the WLAN UE may need to select a PLMN through which to authenticate, if more than one is available behind the chosen WLAN. This is called VPLMN selection in the WLAN inter working.

However, the proposed procedure has a problem. After associating with an access point, the WLAN UE initiates the VPLMN selection process. EAP (extensible authentication protocol) as defined in the IETF Internet Engineering Task Force draft as defined in draft-arkko-pppext-eap-aka (EAP AKA (authentication and key agreement) authentication) and draft-haverinen-pppext-eap-sim (EAP SIM (subscriber Identity module)). Both of these documents are hereby incorporated by reference.

When the WLAN user equipment receives an EAP failure indicating that the procedure has failed, it is not always advised as to the reason of the failure. This is disadvantageous because the WLAN UE could end up associating with each available access point until it finds one which supports WLAN inter working and/or has the capability to route the WLAN user equipment authentication signalling to the home server. At this point, it is possible that the WLAN user equipment is not aware whether the AP supports WLAN IW and therefore is not able route EAP signalling to the home AAA server. It may also be possible that the AP supports WLAN inter working with the routing failing for other reasons, for example there is not a direct roaming relationship with the respective home PLMN. Yet another possible cause of failure could be authentication failure at the home server, even if the AP was able to route the signalling to the HPLM.

SUMMARY OF THE INVENTION

It is the aim of the embodiments of the present invention to address the problems discussed.

According to a first aspect of the present invention, there is provided a method of connecting user equipment to a communications network via a wireless local area network, said method comprising the steps of a first selecting step for selecting an access point, a second selecting step for selecting a communications network, wherein if said connection fails, sending a message comprising information indicating if said access point supports inter-working with a communications network.

According to another aspect of the present invention, there is provided a method of connecting user equipment to a communications network via a wireless local area network, said method comprising the steps of a first selecting step for selecting an access point, a second selecting step for selecting a communications network, wherein if said connection fails, sending a message comprising information indicating a location at which said connection fails.

According to another aspect of the present invention, there is provided a system comprising user equipment to be connected to a communications network via a wireless local area network, said wireless local area network having an access point, wherein if said connection fails, the wireless local area network is arranged to send a message to the user equipment comprising information indicating if said access point supports inter-working with the communications network.

According to another aspect of the present invention, there is provided a system comprising user equipment to be connected to a communications network via a wireless local area network, said wireless local area network having an access point, wherein if said connection fails, the wireless local area network is arranged to send a message to the user equipment comprising information indicating a location in said network at which said connection fails.

According to another aspect of the present invention, there is provided an entity of a wireless local area network in a system comprising user equipment to be connected to a communications network via the wireless local area network, said wireless local area network having an access point, said entity being arranged to send a message to the user equipment comprising information indicating if said access point supports inter-working with the communications network.

According to another aspect of the present invention, there is provided user equipment for connection to a communications network via a wireless local area network, said user equipment comprising means for receiving a message if a connection fails, comprising at least one of information indicating if an access point supports inter-working with a communications network and information indicating a location at which said connection fails.

According to another aspect of the present invention, there is provided user equipment for connection to a communications network via a wireless local area network, said user equipment comprising means for receiving a message if a connection fails, and response to said message said user equipment is arranged to do at least one of the following: select a different access point, select a different communications network, retry to establish said connection, retry authentication and provide identity information.

BRIEF DESCRIPTION OF THE DRAWINGS

For a better understanding of the present invention and as to how the same may be carried into effect, reference will now be made by way of example only to the accompanying drawings in which:

FIG. 3 shows signalling in various embodiments of the present invention.

DETAILED DESCRIPTION OF PREFERRED EMBODIMENTS OF THE INVENTION

Figure 1:
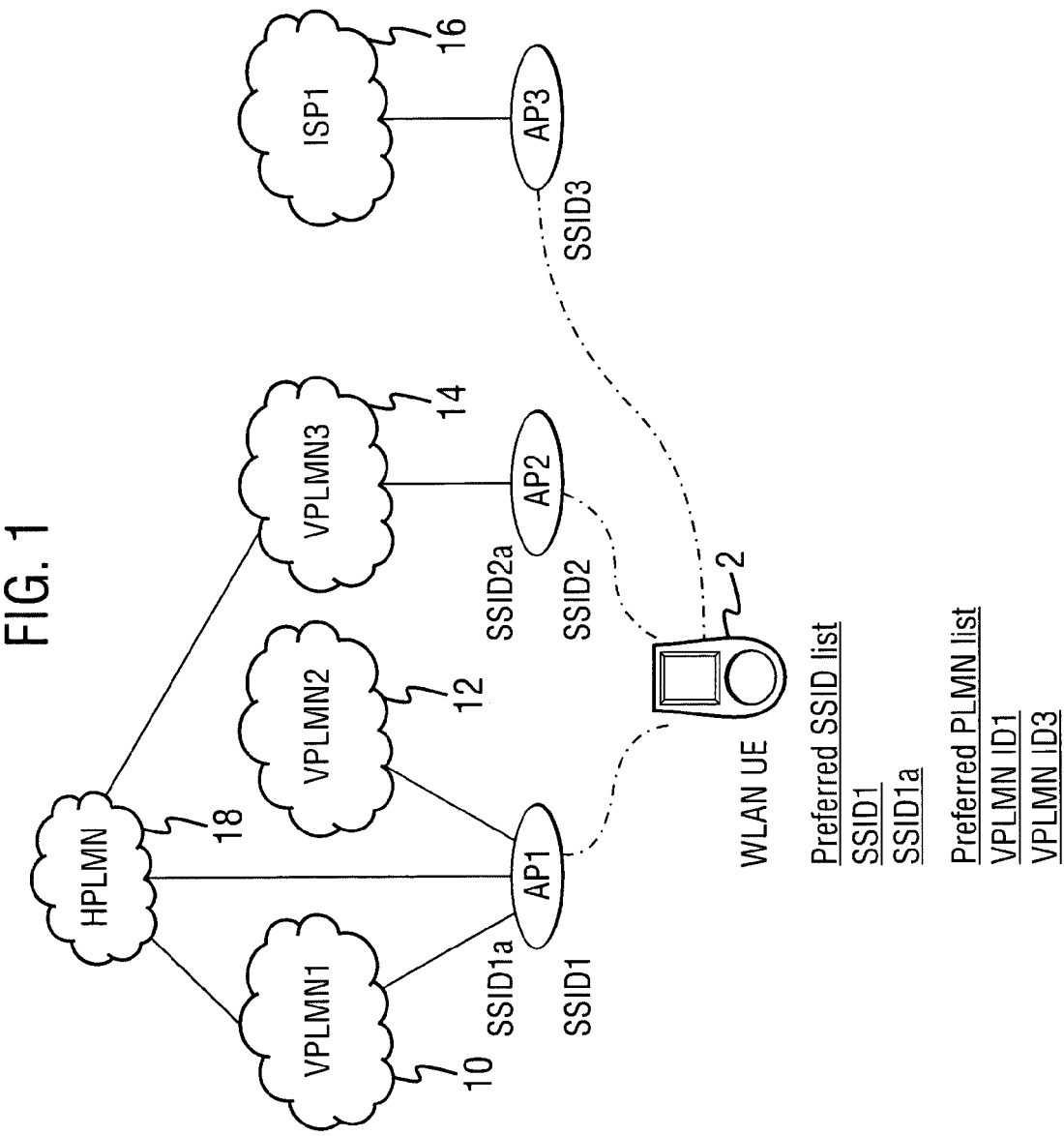
FIG. 1 shows schematically an environment in which embodiments of the present invention can be implemented.

Reference is made to FIG. 1, which shows an environment in which embodiments of the present invention can be implemented. WLAN user equipment 2 is shown. As mentioned previously, WLAN UE 2 can be arranged to communicate just with WLANs or with both WLANs and GPP networks. The UE includes all equipment that is in possession of the end user, such as a computer, WLAN radio interface adapter etc. The UE may for example be a personal digital assistant (PDA), portable computer, fixed computer, mobile telephone or combinations thereof.

The WLAN UE is arranged to make a connection with an access point (AP). In the arrangement shown in FIG. 2, three access points, AP1, AP2 and AP3 are shown. All of these access points are provided in different WLANs. It should be appreciated that some embodiments of the present invention, a WLAN may have more than one access point and where there is more than one access point, the WLAN UE may be capable of accessing more than one access point of a given WLAN. The same access point can allow access to more than one different WLANs.

The respective WLAN access networks, of which the three APs, AP1-3 form a part are not shown but may also include intermediate AAA (authentication, authorisation and accounting) elements. A WLAN may include other devices such as routers.

The first access point AP1 is connected to a first VPLMN 10 and a second VPLMN 12.

Figure 2:
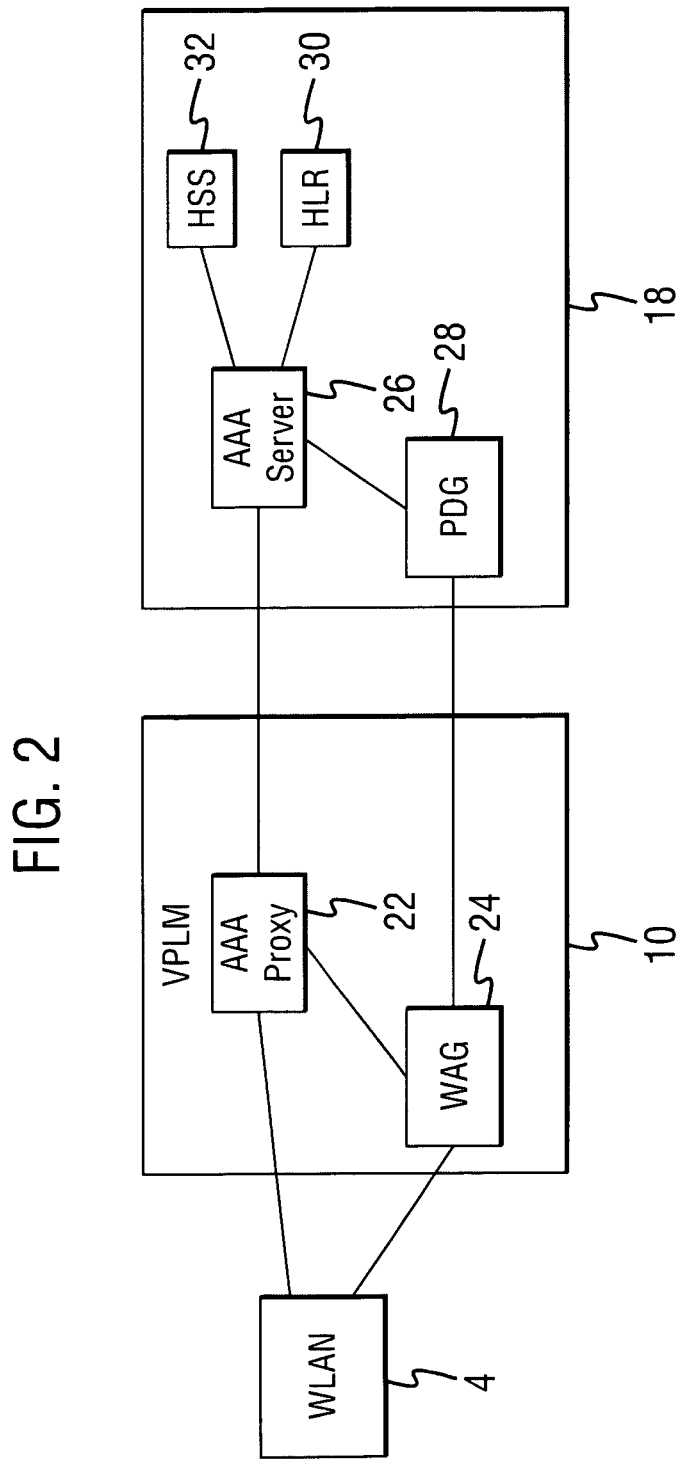
FIG. 2 shows one VPLM and the HPLM of FIG. 1 in more detail.

FIG. 2 shows a WLAN 4, which contains the first access point AP1 connected to the first VPLMN 10. The VPLMN 10 is not the home network of the subscriber. Accordingly, the VPLMN 10 comprises an AAA proxy 22 and a WAG (wireless access gateway) 24. The VPLMN 10 is connected to the home PLMN 18 associated with the user of the user equipment. The HPLMN 18 is shown in more detail in FIG. 2. The HPLMN 18 comprises an AAA server 26, a packet data gateway 28, a home location register HLR 30 and a HSS 32.

The first access point AP1 is also connected to a second VPLMN 12. However, this second VPLMN 12 is not able to make a connection to the HPLMN 18. This may for example because for example there is no appropriate roaming agreement with the HPLMN 18. Finally the first access point is also directly connected to the HPLMN 18.

The second access point AP2 is connected to a third VPLMN 14. The third VPLMN 14 has a connection to the HPLMN 18. It should be appreciated that the third VPLMN 14 has a similar structure to the first VPLM shown in FIG. 2.

The third access point AP3 is connected to an internet service provider 16. This allows the user to access the Internet.

In preferred embodiments of the present invention, the user equipment will be provided with a SSID (service set identifier) list, which lists the preferred addresses. In the embodiment shown in FIG. 1, access point 1 AP1, which has addresses SSID1 and SSID1a is included on the list. The first address SSID1 is associated with one operator and the second address SSID1a is associated with another operator.

The user equipment also has a preferred PLMN list. In the arrangement shown in FIG. 1 the first and third VPLMNs 10 and 14 are the preferred PLMNs and are listed. This is because these VPLMNs allow the user equipment to be connected to the HPLMN.

Embodiments of the present invention propose to use EAP notifications. In particular, embodiments of the invention use EAP/SIM notifications (used in GSM global system for mobile communications) and EAP/AKA notifications (used in 3G systems). Embodiments of the present invention use new notification codes to indicate to the user equipment the reason for an authentication failure response (for example as a result of a wrong network selection). It should be appreciated that this may imply either radio selection or VPLMN selection failure. This information makes the network selection process more effective.

Reference is now made to FIG. 3 which shows signalling in four embodiments of the present invention.

Consider case a. In case a, the WLAN (of which the AP is part) supports WLAN inter working. In the example associated with case a, authentication signalling could not be routed to the AAA server 22 of the HPLMN.

In step S1, the WLAN shall issue an EAP Req/identity. The EAP Req/Identity is a request for the identity of the UE.

In step S2, on receipt of the EAP request, the UE 2 sends EAP response/identity message. The EAP Resp/identity is a response, which provides the identity of the UE and may for example be the user's international mobile subscriber identity (IMSI), a temporary identity or any other suitable identity information. In preferred embodiments of the invention this may be the root NAI (network access identifier). This can take the form of: userX@HPLM id. In other words the user and the associated network are identified.

In step S3, the WLAN sends an EAP request/identity message including a network advertisement. This will occur if the root NAI is not understood. In step S4 the user equipment set to the WLAN EAP response/identity message including decorated NAI (Network access identifier). This will take the form of: userX@VPLM1 "HPLMN". In other words, there is information identifying the VPLMN via which the HPLMN is connected as well as the HPLMN. Steps S3 and S4 provide network advertisement information to the UE using an extra EAP Req/identity and EAP Resp/identity exchange. These steps are optional and can be omitted in some embodiments of the present invention, if the root NAI is understood.

In step S5, the WLAN sends an EAP notification code to the user equipment. The EAP notification will include a notification code, which indicates the cause of the failure. This will include an indication that the WLAN supports WLAN inter working.

On receipt of the indication that the WLAN supports WLAN inter working, the WLAN user equipment may proceed by trying to associate with another access point or may decide to remain with a currently associated AP and try to authenticate with HPLMN by for example selecting another VPLMN. Other actions are of course possible.

In step S6, the WLAN sends an EAP failure message. The EAP failure message is sent if the connection has failed. In some embodiments of the invention, this message may be omitted, with the information in the notification message being used to provide the failure information.

Case b will now be described. In case b, the WLAN does not support inter working WLAN. Steps T1 and T2 correspond to steps S1 and S2 respectively. Steps corresponding to steps S3 and S4 may be provided if necessary. In step T3, the WLAN 20 sends an EAP failure message. In this case, the user equipment will most probably not receive any EAP notifications before the EAP failure. In this way, the user equipment will know that the WLAN probably does not support WLAN inter working.

In cases C and D, the WLAN supports WLAN inter working and the authentication fails in the HPLMN 18.

In case c, the authentication is not started. Steps A1 and A2 correspond to steps S1 and S2 respectively. In step A3, an EA response including the root NAI or the decorated NAI is sent from the WLAN to the AAA server 26.

In step A4, an EAP notification is sent from the server 26 to the WLAN. This EAP notification is forwarded by the WLAN to the user equipment in step A5. This notification will indicate that the procedure failed prior to authentication.

In step A6, the server 26 sends an EAP failure message to the WLAN. In step A7 the EAP failure message is sent to the user equipment.

In case D, the authentication has been performed. Steps B1, B2 and B3 correspond to steps A1, A2 and A3.

In step B4, the EAP notification is sent from the server 26 to the WLAN 20. In step B5, the EAP notification is sent from the WLAN 20 to the user equipment 2 indicating that the failure was a result of authentication failure.

In step B6, an EAP failure message is sent from the server 26 to the WLAN 20. The WLAN 20 sends the EAP failure message to the user equipment in step B7.

Thus, in cases c and d, the EAP notification includes an indication of the authentication failure message before the EAP failure message is sent. The indication could also include a pointer to the state when the authentication fails and/or further actions to be taken by the user equipment.

On receipt of the notification packet including an indication of the authentication fails at the HPLMN the user equipment may proceed by trying to authenticate itself with the HPLMN. If the network indicates in the new notification code that it does understand the user identity. WLAN user may reissue NAI and try to authenticate again. If the network indicates in the new notification code that it can not access some authentication parameters, e.g. triplets, the user equipment may try to authenticate again after timer expiry. Other actions and other reasons why authentication could fail are also possible.

Embodiments of the invention are implemented using the attribute "AT_NOTIFICATION" defined in the IETF draft documents mentioned previously.

The notification message can be used to convey a displayable message from the appropriate server, either in the WLAN or the 3GPP server, depending on the circumstances to the user equipment. These messages are textual messages.

The notification code is a 16-bit number. The most significant bit is called the Failure bit (F). The F bit specifies whether or not the notification implies failure. The code values with the F bit set to zero are used in the for the unsuccessful cases and in preferred embodiments is set to zero where failure has occurred and the reasons for the failure are included in the notification message.

The notification code also has a Phase bit "P". It specifies at which phase the notification can be used. If the P bit is set to zero, it is used after the challenge round in full authentication or re-authentication in re-authentication. The attribute AT_MAC may be included in the notifications.

If the P bit is set to one, the notification is used before the challenge round in full authentication or the re-authentication round in re-authentication. The attribute AT_MAC may not be included in the notification.

In embodiments of the invention, the error causes can be indicated by appropriated text or they can be indicated by error codes. Error codes effectively assign different values to different error conditions. Where error codes are use, the user equipment is arranged to be able to decode these error codes to determine the cause of failure.

In response to information identifying the cause of failure, the user equipment may display an appropriate message for the user. Alternatively or additionally the user equipment may modify its behaviour, as indicated in some of the examples, in response to the error message.

Thus in embodiments of the present invention, the following failure reasons can be given Information indicating that authentication signalling could not be routed to a server;

Information indicating that authentication signalling was routed to a server and authentication failed;

Information indicating that authentication signalling was routed to a server and authentication failed before challenge;

Information indicating that authentication signalling was routed to a server and authentication failed after challenge;

Information indicating that said access point does not support inter-working with said communication network;

Information indicating that there is no roaming relationship with a home network;

Information indicating a location of the network failure;

Information indicating a reason for said failure;

Information indicating an internal failure in at least one of said access point and communications network;

Information indicating a temporary unavailability of at least one of said access point and communications network; and Information indicating traffic congestion.

In preferred embodiments of the invention, the requirement to provide information as to the cause of a failure of a connection is mandatory except in the case where inter-working is not supported.

Embodiments of the invention have been described in the context of using notification messages to provide the error information. It should be appreciated that a new message may be created to provide said information or one of the other messages may be modified to provide this information. For example, a new attribute can be defined.

EAP-TLV Type length values may be used in alternative embodiments of the invention.

Embodiments of the invention have been described in the context of the EAP protocol. However it should be appreciated that other protocols may be used in alternative embodiments of the invention.

The described preferred embodiments of the invention have been described in the context of inter-working with a 3G network. Embodiments of the invention may also be applied to other types of network including the Internet and other types of communication network, which may be based on wired or wireless technologies.

The invention claimed is:

1. A method comprising:
    accessing, by a user equipment, an access point to attempt to establish a connection to a communications network comprising at least one of a home public land mobile network and a visited public land mobile network;
    receiving, in response to the accessing resulting in a failure in the attempt to establish the connection and before an extensible authentication protocol failure message is received, an extensible authentication protocol notification message at the user equipment, the extensible authentication protocol notification message indicating at least one reason for the failure in the attempt to establish the connection to the communication network interworking with the access point, the at least one reason for the failure comprising information indicating whether the failure was due to a temporary unavailability of the access point and/or the communications network, the extensible authentication protocol notification message comprising a multi-bit notification code including a first portion of the multi-bit notification code specifying whether the at least one failure occurred;
    selecting, in order to access an authentication server at the communication network, the access point, when the at least one reason for failure indicates temporary unavailability, or another access point, when the at least one reason for failure does not indicate temporary unavailability.

2. The method as claimed in claim 1, wherein the message comprises information indicating a cause for the failure.

3. The method as claimed in claim 2, wherein the message comprises at least one of the following:
    information indicating that authentication signaling could not be routed to a server;
    information indicating that authentication signaling was routed to the server and authentication failed;
    information indicating that authentication signaling was routed to the server and authentication failed before an authentication challenge;
    information indicating that authentication signaling was routed to the server and authentication failed after the authentication challenge;
    information indicating that there is no roaming relationship with a home network;
    information indicating a location of the network failure;
    information indicating an internal failure in at least one of the access point and the communications network; and
    information indicating traffic congestion.

4. The method as claimed in claim 1, further comprising: selecting the communications network.

5. The method as claimed in claim 1, further comprising: authenticating the user equipment.

6. The method as claimed in claim 5, wherein the authenticating comprises authenticating the user equipment via the communications network.

7. The method as claimed in claim 1, wherein in response to the message at least one of the following is performed:
    selecting a different access point;
    selecting a different communications network;
    retrying to establish the connection;
    retrying an authentication; and
    providing identity information.

8. The method as claimed in claim 1, further comprising receiving another message, wherein when the connection fails, the other message indicates the failure.

9. The method as claimed in claim 1, wherein a failure bit in the message is set to a value indicative of the failure.

10. The method as claimed in claim 1, further comprising receiving a plurality of messages, wherein the plurality of messages is in accordance with an extensible authentication protocol.

11. The method as claimed in claim 1, wherein the information in the message comprises at least one error code.

12. The method as claimed in claim 1, wherein the receiving the message comprises receiving information that is at least one of an extensible authentication protocol attribute message and an extensible authentication protocol type-length-value message.

13. The method as claimed in claim 1, wherein the access point is included in a wireless local area network.

14. The method as claimed in claim 4, wherein the selecting the communications network comprises selecting the visited public land mobile network.

15. An apparatus, comprising:
    at least one processor; and
    at least one memory including computer program code, the at least one processor, the at least one memory, and the computer program code configured to cause the apparatus to at least:
    access an access point to attempt to establish a connection to a communications network comprising at least one of a home public land mobile network and a visited public land mobile network;

receive, in response to the access resulting in a failure in the attempt to establish the connection and before an extensible authentication protocol failure message is received, an extensible authentication protocol notification message at the apparatus, the extensible authentication protocol notification message indicating at least one reason for the failure in the attempt to establish the connection to the communication network interworking with the access point, the at least one reason for the failure comprising information indicating—whether the failure was due to a temporary unavailability of the access point and/or the communications network, the extensible authentication protocol notification message comprising a multi-bit notification code including a first portion of the multi-bit notification code specifying whether the at least one failure occurred;

select, in order to access an authentication server at the communication network, the access point, when the at least one reason for failure indicates temporary unavailability, or another access point, when the at least one reason for failure does not indicate temporary unavailability.

16. The apparatus as claimed in claim 15, wherein in response to the message, the receiver performs at least one of:
select a different access point;
select a different communications network;
retry to establish the connection;
retry an authentication; and
provide identity information.

17. The apparatus as claimed in claim 15, wherein the receiver determines that inter-working is not possible when the receiver does not receive the message.

18. The apparatus as claimed in claim 15, wherein the message comprises information indicating a cause for the failure of the attempt to establish the connection.

19. The apparatus as claimed in claim 18, wherein the message comprises at least one of the following:
information indicating that authentication signaling could not be routed to a server;
information indicating that authentication signaling was routed to the server and authentication failed;
information indicating that authentication signaling was routed to the server and authentication failed before an authentication challenge;
information indicating that authentication signaling was routed to the server and authentication failed after the authentication challenge;
information indicating that there is no roaming relationship with a home network;
information indicating a location of the network failure;
information indicating an internal failure in at least one of the access point and the communications network; and
information indicating traffic congestion.

20. The apparatus as claimed in claim 15, further comprising:
a selector to select the access point.

21. The apparatus as claimed in claim 20, wherein the access point is included in a wireless local area network.

22. The apparatus as claimed in claim 15, further comprising:
a selector configured to select a communications network.

23. The apparatus as claimed in claim 22, wherein the selector is configured to select the visited public land mobile network.

24. The apparatus as claimed in claim 15, wherein the receiver is configured to receive another message, wherein when the connection fails, the other message indicates the connection has failed.

25. The apparatus as claimed in claim 15, wherein the receiver is further configured to receive information that is a notification message.

26. The apparatus as claimed in claim 15, wherein a failure bit in the message is set to a value indicative of failure.

27. The apparatus as claimed in claim 15, wherein the receiver is further configured to receive a plurality of messages, wherein the plurality of messages are in accordance with an extensible authentication protocol.

28. The apparatus as claimed in claim 15, wherein the information in the message comprises at least one error code.

29. The apparatus as claimed in claim 15, wherein the receiver is further configured to receive information that is at least one of an extensible authentication protocol attribute message and an extensible authentication protocol type-length-value message.

* * * * *